United States Patent [19]

Ema

[11] Patent Number: 4,802,093
[45] Date of Patent: Jan. 31, 1989

[54] X-RAY IMAGE-PROCESSING APPARATUS UTILIZING GRAYSCALE TRANSFORMATION

[75] Inventor: Takehiro Ema, Ootawara, Japan

[73] Assignee: Kabushiki Kaisha Toshiba, Kawasaki, Japan

[21] Appl. No.: 933,214

[22] Filed: Nov. 21, 1986

[30] Foreign Application Priority Data

Nov. 22, 1985 [JP] Japan .................................. 60-261284

[51] Int. Cl.⁴ ...................... A61B 6/00; G01N 23/04; G06F 15/42
[52] U.S. Cl. .............................. 364/413.23; 378/99; 358/111; 382/6; 382/54
[58] Field of Search ....................... 364/414; 382/54, 6, 382/18; 250/369; 378/99; 358/111

[56] References Cited

U.S. PATENT DOCUMENTS

| | | | |
|---|---|---|---|
| 4,322,797 | 3/1982 | Lickel | 364/414 |
| 4,430,749 | 2/1984 | Schardt | 364/414 |
| 4,491,866 | 1/1985 | Verhoeven | 364/414 |
| 4,504,908 | 3/1985 | Riederer | 364/414 |
| 4,546,255 | 10/1985 | Knoll | 364/414 |

*Primary Examiner*—Jerry Smith
*Assistant Examiner*—Gail O. Hayes
*Attorney, Agent, or Firm*—Oblon, Fisher, Spivak, McClelland & Maier

[57] ABSTRACT

An X-ray image-processing apparatus includes a subtraction circuit for performing subtraction between a mask image and a contrast image, and a grayscale-transforming circuit for transforming the grayscales of the mask image, based upon the grayscales of the contrast image, so as to reduce the difference in the grayscales between these images. This grayscale transformation is performed before the subtraction processing.

14 Claims, 11 Drawing Sheets

F I G. 4A
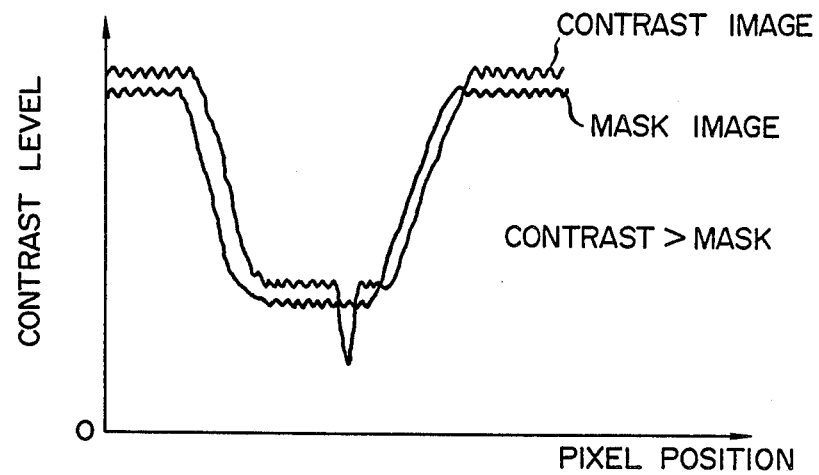
F I G. 4B
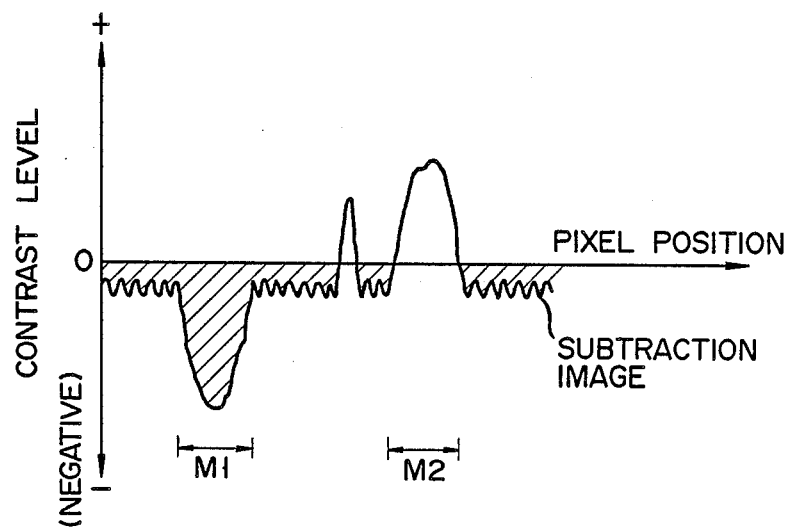

F I G. 5A
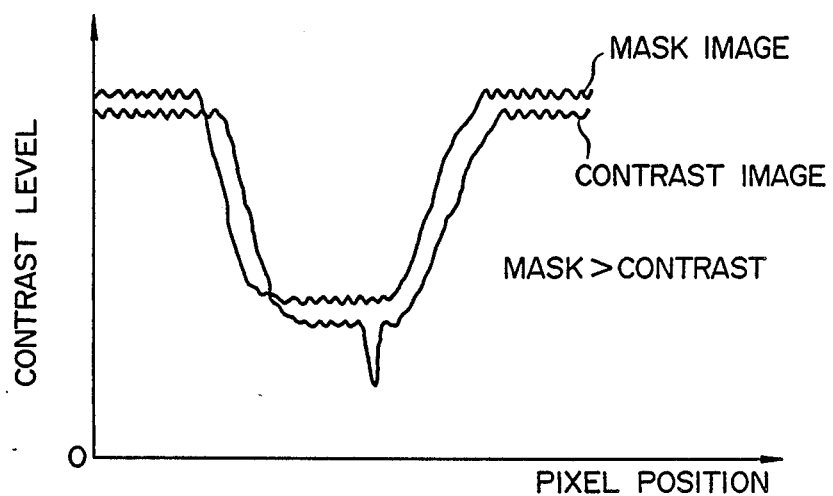
F I G. 5B
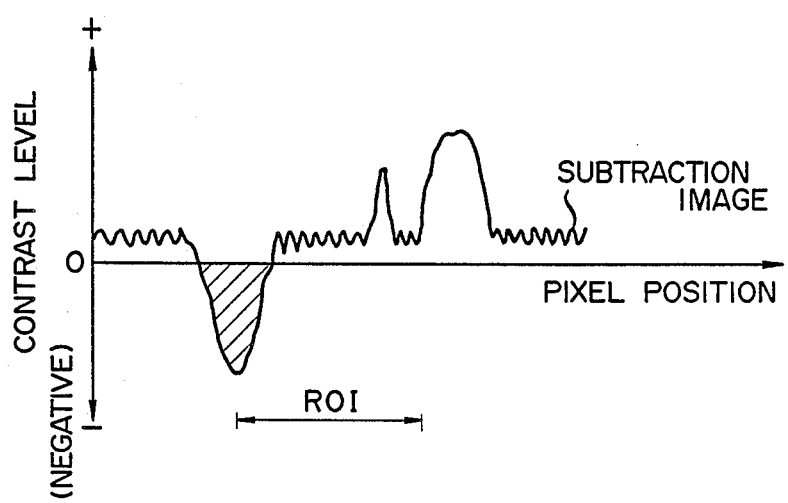

SHIFT DIRECTIONS & AMOUNTS
$\begin{cases} 12: dx = -D, dy = -D \quad (D > 0) \\ 13: dx = 0, dy = -D \\ 14: dx = D, dy = -D \\ 15: dx = -D, dy = 0 \\ 16: dx = D, dy = 0 \\ 17: dx = -D, dy = D \\ 18: dx = 0, dy = D \\ 19: dx = D, dy = D \\ 20: dx = 0, dy = 0 \end{cases}$

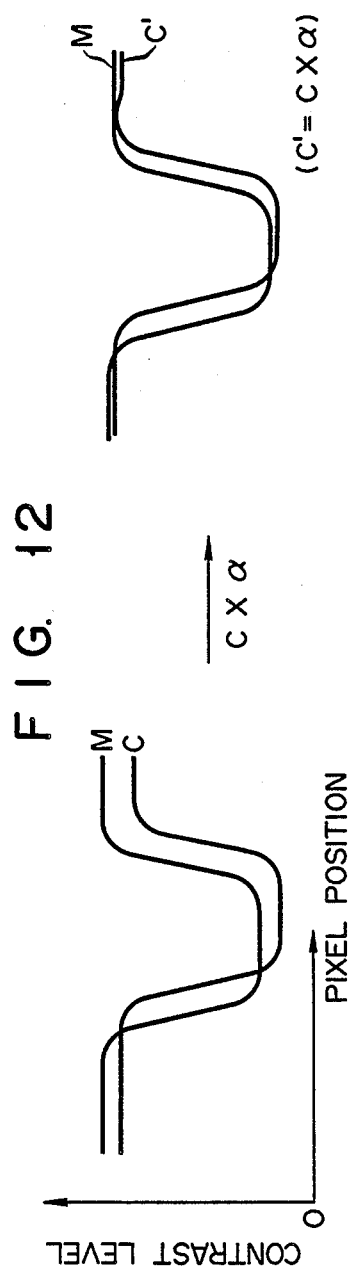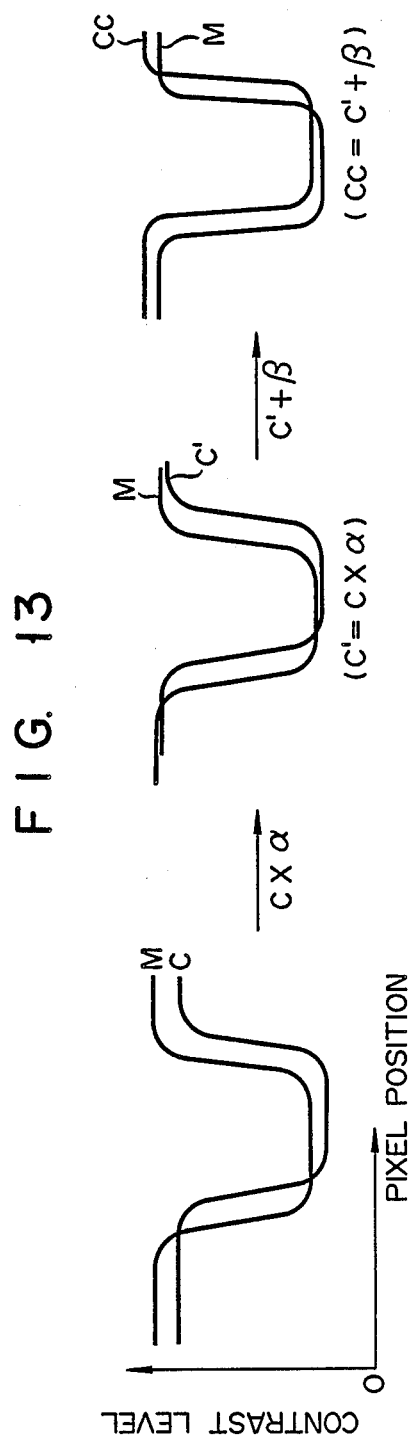

X-RAY IMAGE-PROCESSING APPARATUS UTILIZING GRAYSCALE TRANSFORMATION

BACKGROUND OF THE INVENTION

1. Field of the Invention

The present invention generally relates to an X-ray image-processing apparatus, and more particularly, to an X-ray image processor for transforming a grayscale of either a mask image or a contrast image of an object under medical examination.

2. Description of the Prior Art

In a conventional radiation image-processing apparatus utilizing X-rays or the like as a radiation source, an integrated image (referred to as a "mask image") of, for example, one or more images taken before a contrast medium is injected into a region of interest in an object under medical examination, and an integrated image (referred to as a "contrast image") of, for example, one or more images taken after the contrast medium is injected into the region of interest, are input to a digital subtracter. The digital subtracter calculates the difference between pixel values, or contrast levels of the mask and contrast images, in units of pixels, to extract a specific region of an image where the contrast medium is present. The resulting image is known as "a subtraction image". However, the object under examination such as a patient is often moved in a complicated manner while at least the two images (i.e., the mask and contrast images) are being acquired. In such a case, a motion artifact, resulting from a positional shift between the mask and contrast images, is superimposed on images of blood vessels and internal organs. This undersirable image superposition renders proper diagnosis impossible.

A typical example of X-ray image-processing techniques for acquiring a plurality of mask and contrast images is described, for instance, in U.S. Pat. No. 4,544,949 issued on Oct. 1, 1985 to Kurihara.

In order to overcome the above-mentioned drawback, attempts have been made to shift the contrast image in order to minimize a total of negative component data of subtraction image data designating the region of interest set on the subtracted image, thereby correcting the positional shift.

An example of such an attempt is disclosed in Japanese unexamined (KOKAI) patent application No. 59-151941 opened on Aug. 30, 1984.

However, a contrast (grayscale) level difference between the mask and contrast images exists, caused by time-depending variations in tube current of an X-ray tube. For this reason, since the total of the negative component data of the subtraction image data is used as a criterion, the positional shift between the mask and contrast images is not often corrected with sufficient accuracy.

As is well known in the art, when the tube voltage of the X-ray tube changes, the X-ray wavelength changes accordingly (i.e., the X-ray characteristics, the X-ray transmissivity), whereas the tube current changes, the X-ray tube's output (power) changes, although its wavelength remains the same. The changes in tube current may usually occur during the period necessary for acquiring a plurality of mask and contrast images (i.e., during a relatively long image acquisition time period. As a result, variations occur in the contrast level or grayscale of the acquired images. In other words, when using such a typical subtraction method for acquiring a desired subtraction image, by way of a contrast-level (grayscale) difference, such variations in contrast level constitute a significant drawback.

The present invention has been made in consideration of the above situation, and has as its object to provide a radiation image-processing apparatus capable of accurately correcting a positional shift between the mask and contrast images, and also to provide an artifact-free subtraction image, whereby accurate medical diagnosis can be performed.

SUMMARY OF THE INVENTION

To achieve the foregoing objects, and in accordance with the purpose of the present invention, an X-ray image-processing apparatus comprises X-ray radiation means for irradiating X-rays toward an object under examination to produce X-ray images as a mask image and a contrast image, said mask image being produced before penetration of a contrast medium into a region of interest (ROI) of the object and said contrast image being produced after penetration of the contrast medium into the ROI, and image-processing means including means for transforming a grayscale of one of said mask image and contrast image to reduce a difference in the grayscale between said mask image and said contrast image, and subtraction means for performing subtraction between said mask image and said contrast image so as to obtain a subtraction image useful for medical examination, the grayscale of one of said both images being transformed by said grayscale transforming means.

BRIEF DESCRIPTION OF THE DRAWINGS

The above and other objects, features, and advantages of the present invention will be more apparent from the following more particular description, presented in conjunction with the following drawings, in which:

FIGS. 4A & B to 5B show contrast profiles of mask, contrast, and subtraction images processed in the image-processing apparatus shown in FIG. 1;

FIGS. 12 and 13 illustrate other grayscale-transformation methods.

DETAILED DESCRIPTION OF THE PREFERRED EMBODIMENT

ARRANGEMENT OF X-RAY IMAGE-PROCESSING APPARATUS

Figure 1:
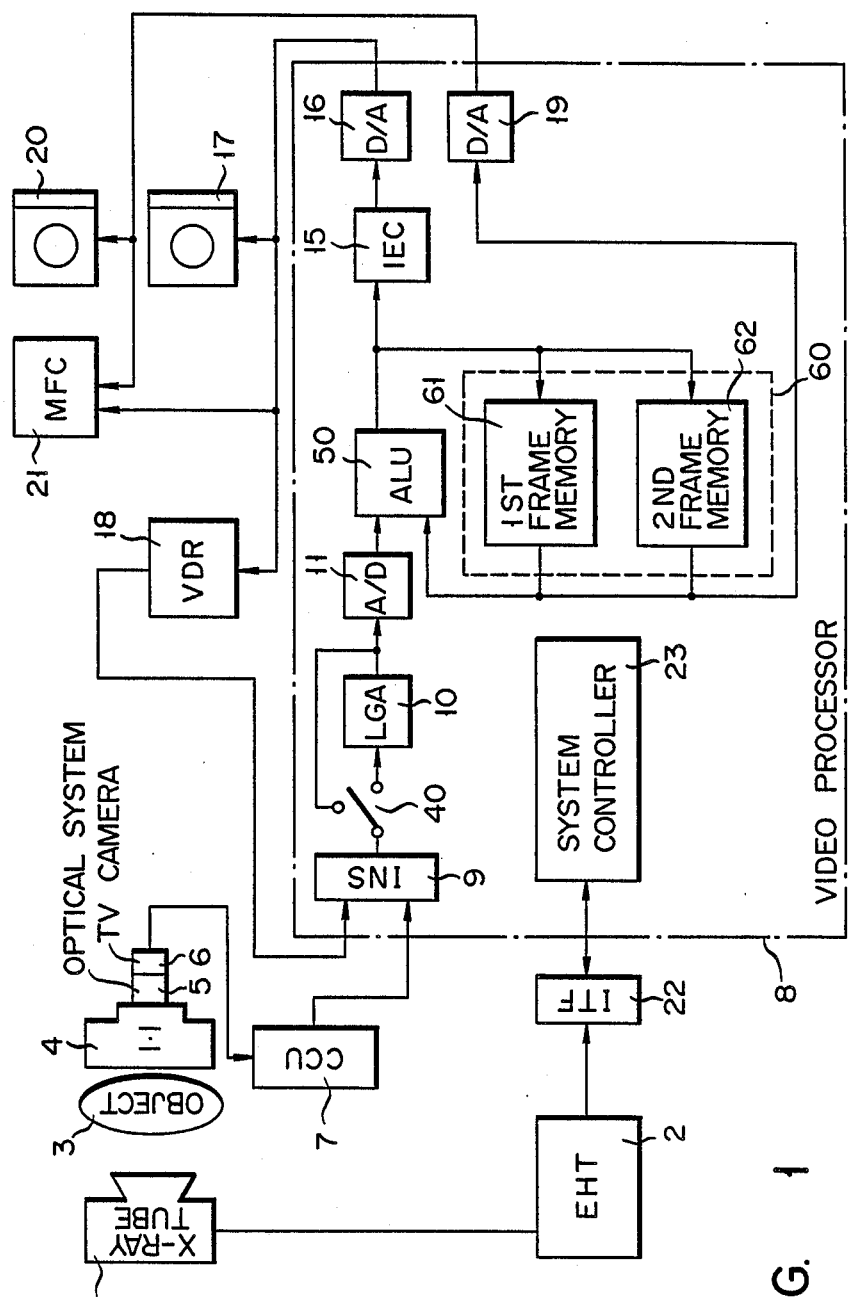
FIG. 1 is a block diagram of an X-ray image-processing apparatus according to one preferred embodiment.

Referring now to FIG. 1, an arrangement of an X-ray image-processing apparatus according to one preferred embodiment of the invention will be summarized.

Reference numeral 1 denotes an X-ray tube. Pulsed X-rays are exposed toward an object 3 to be examined from the X-ray tube 1 to which a high voltage generated by an extra high tension generating device 2 is applied. Reference numeral 4 indicates an image intensifier for receiving an X-ray image penetrating through the object (to which the X-rays are exposed) and then converting the X-ray image into a corresponding optical image. The optical image output from the image intensifier 4 is projected onto a pick-up tube of a TV camera 6 via an optical system/a diaphragm 5, and thereafter is converted into a video signal in a camera control unit 7 (referred to as "CCU"). The video signal is supplied to a video processor 8. This video signal is converted into a digital video signal by an analog/digital converter 11 in such a manner that the former signal derived from CCU 7 is supplied to the converter 11 via an input selector 9 and, if necessary, a log amplifier 10. In a normal condition, the video signal from the input selector 9 is supplied directly to the A/D converter 11 via a switch 40 so as to bypass the log amplifier 10. The video signal which has been converted into a digital form is processed in an arithmetic and logic unit 50 (referred to as "ALU") and then stored in a first frame memory 61 of a memory unit 60. This processing operation is so-called "a first arithmetic operation" in this specification. The first arithmetic operation includes the following processing operation. That is, the mask image signals are summed for e.g., several frames and an average thereof is taken so as to eliminate random noises contained in those signals.

It should be noted that the first frame memory 61 stores the digital video signal obtained from the X-ray image signal that was taken before injection of the X-ray contrast medium into ROI (region of interest) of the object 3 ("mask image memory").

Reference numeral 62 denotes a second frame memory of the memory unit 60. This second fame memory 62 is to store the digital video signal which is obtained from the X-ray image signal that was taken after injection of the X-ray contrast medium into ROI of the object 3 ("contrast image memory"). This storing process is completely identical to that of the first frame memory 62. It should be noted that although the memory unit 60 includes other frame memories than these frame memories 61 and 62, a detailed explanation will be made later.

Two sets of the digital signals which are stored in the first and second frame memories 61 and 62 are subtraction-processed in ALU 50 as "a second arithmetic operation" to obtain a subtraction video signal. The subtraction video signal is supplied via a video signal enhancement circuit 15 to a digital/analog converter 16. Then it is converted into an analog video signal in the D/A converter 16 so that the subtraction video signal is displayed on a first monitor 17, or recorded by a video disc recorder 18.

The other D/A converter 19 is provided in the video processor 8 so as to convert such a digital video signal that is not yet subtraction-processed into an analog video signal (mask image signal). The analog video signal from the second D/A converter 19 is supplied to a second monitor 20 so as to display the mask image of the object 3. This analog video signal is also supplied to be recorded by a multiformat camera 21.

The video disc recorder 18 has a memory capacity of e.g., 600 TV frames. The output video signal from the video disc recorder 18 is fed out at arbitrary timing into the input selector 9 of the video processor 8, and may be displayed through the video processor 8 on the first monitor 17.

The extra high tension generating device 2 is operated under the control of a system controller 23 via an interface 22. It is apparent that the system controller 23 further controls the entire operations of the image processing apparatus.

IMAGE-DATA PROCESSING

Figure 2:
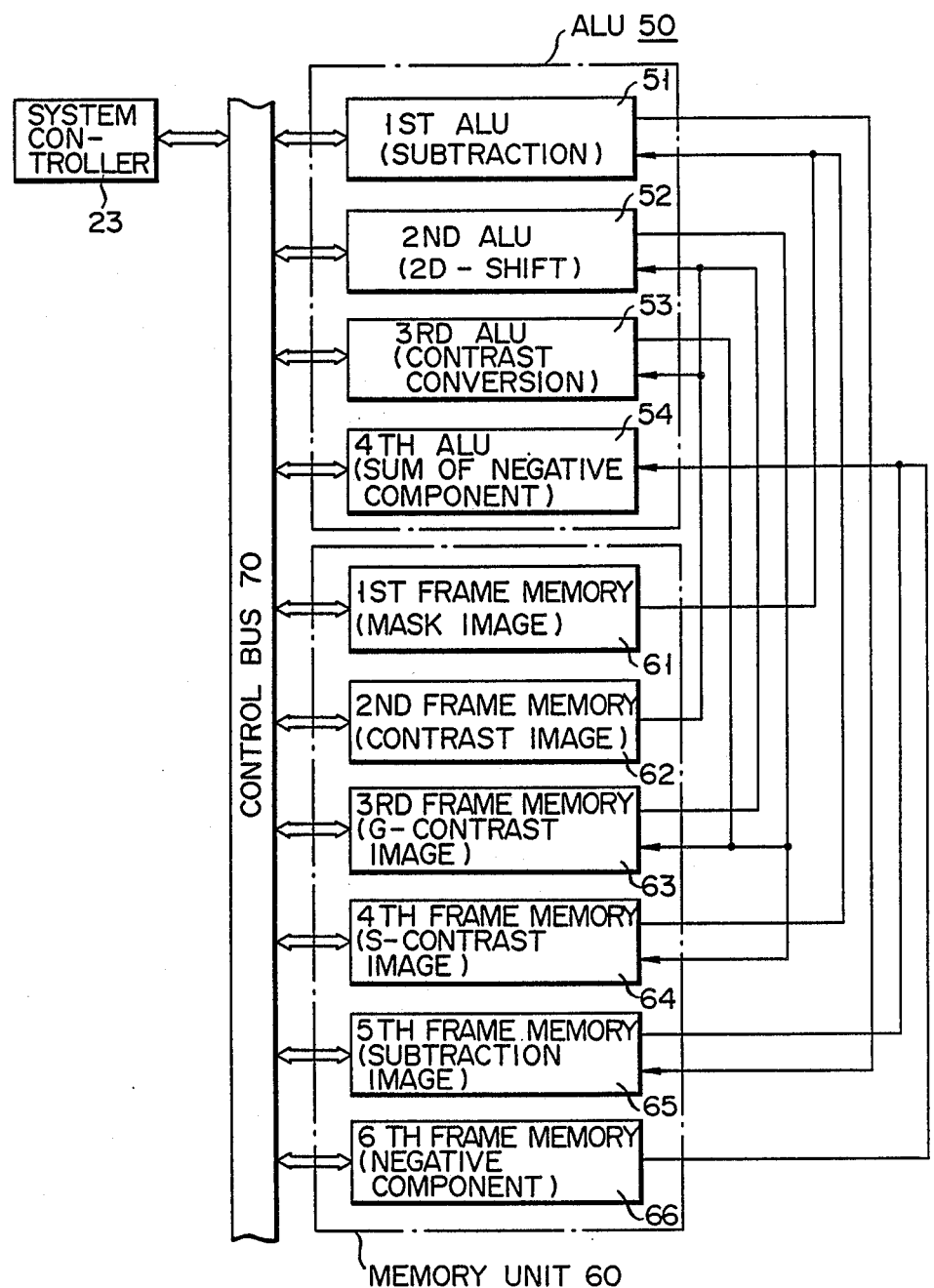
FIG. 2 is a block diagram of ALU 50 and memory unit 60 shown in FIG. 1.

Referring now to FIG. 2, a description will be made of image-data processing according to the invention.

It should be understood that the image-data processing is mainly performed in ALU 50 and memory unit 60.

Reference numeral 23 denotes a system controller for controlling the operation of ALU 50 and memory unit 60 referred to above. System controller 23 is constructed mainly by a CPU (Central Processing Unit).

The arrangement of ALU 50 will be described first. ALU 50 includes a first ALU 51 for performing digital subtraction between two input images (i.e., the mask and contrast images); and a second ALU 52 for two-dimensionally shifting the input images and outputting the result. It furthermore includes a third ALU 53 for performing grayscale transformation of the input images; and a fourth ALU 54 for calculating negative component data of image data within the region of interest (ROI), on the basis of information representing the region of interest. The arrangement of memory unit 60 will then be explained. Memory unit 60 includes a first memory 61 for storing mask image data; a second memory 62 for storing contrast image data; and third, fourth, and fifth memories 63, 64, 65 for storing processed image data, respectively. It furthermore includes a sixth memory 66 for storing data associated with the preset ROI. ALU 50 and memory unit 60 are connected via a bus line 70.

The operation of the image-data processor having the arrangement as described above will now be described with reference to the following drawings as well as FIG. 2.

Figure 3:
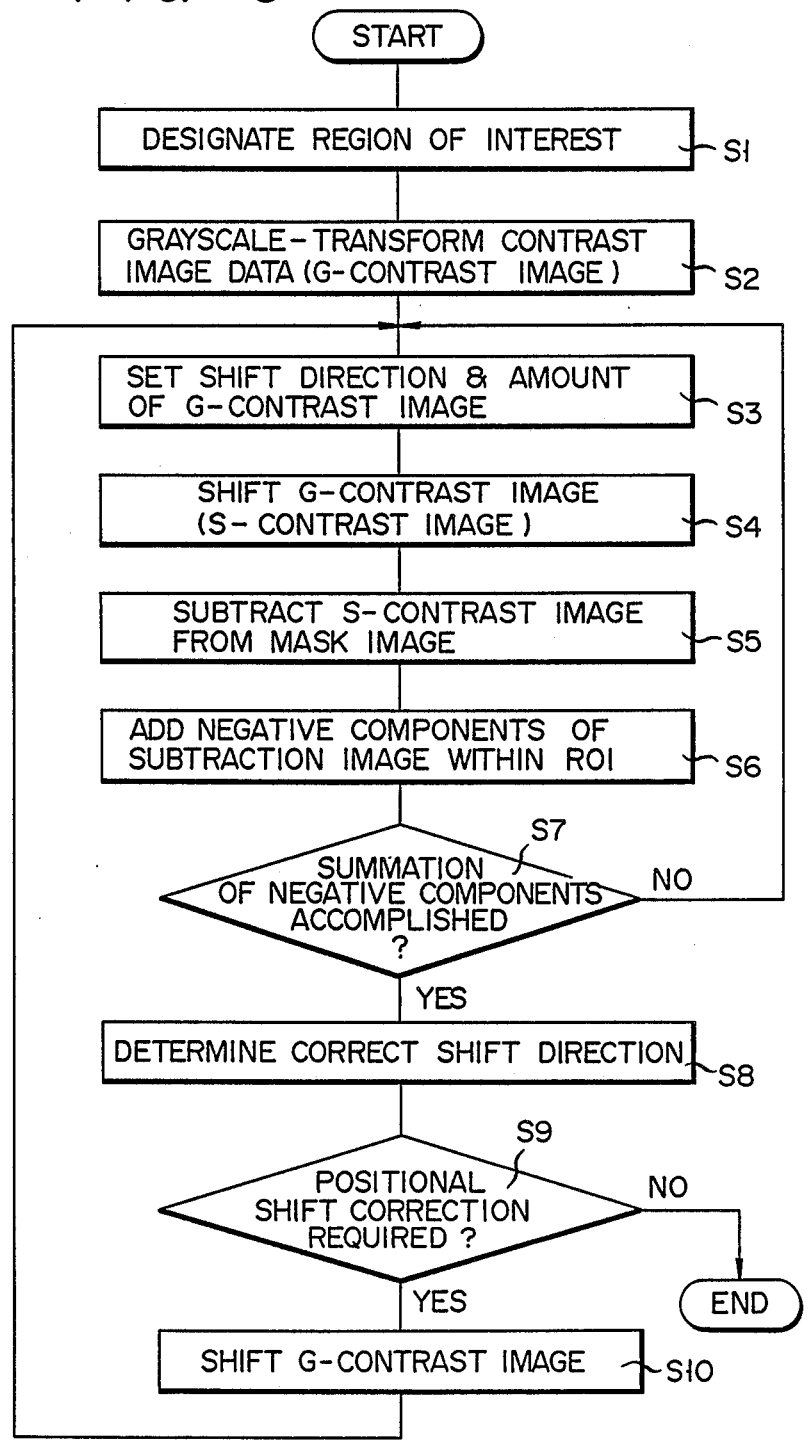
FIG. 3 is a flowchart of the overall operation of the image-processing apparatus shown in FIG. 1.
Figure 6:
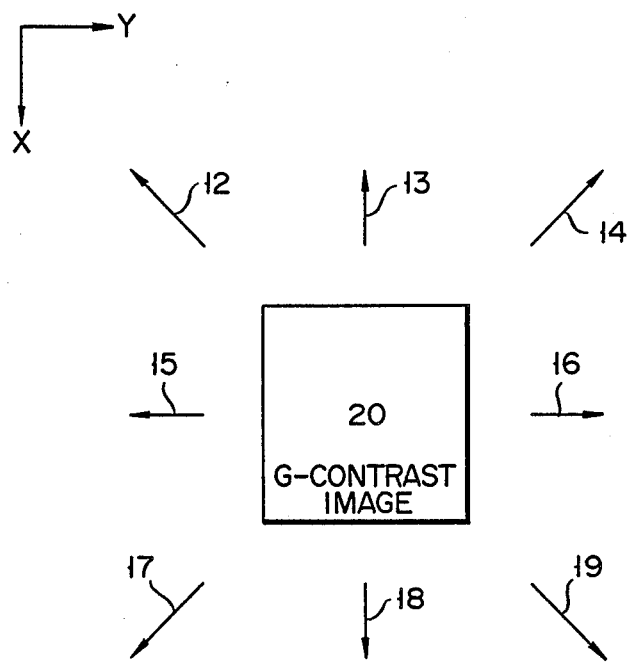
FIG. 6 illustrates shift directions and shift amounts for G-contrast images.

FIG. 3 is a flowchart of positional-shift correction; FIGS. 4A and 5A are respectively graphic representations showing contrast profiles between the mask and contrast images; FIGS. 4B and 5B are graphic representations showing contrast profiles of subtraction images; and FIG. 6 illustrates shift directions and shift amounts of a grayscale-transformed contrast image.

Assume that the mask and contrast image data have previously been written in first and second memories 61 and 62, respectively, under the control of system controller 23.

Referring to FIGS. 2 and 3, ROI of object 3 is chosen, to obtain a total of the negative component data of subtracted-image data (step S1). The negative component data of ROI is written in sixth memory 66. The ratio of the region-of-interest to the entire image area is selected as large as permitted by a size of the entire image area, for a reason to be described later.

Contrast-image data is read out from second memory 62, and is subjected to grayscale transformation in third ALU 53 (step S2). The grayscale-transformed contrast image is referred to herein as a "G-contrast image". The grayscale-transformation need to be performed in consideration of X-ray exposure conditions for acquiring mask and contrast images, and their noise levels (to be described later). In the preferred embodiment, the grayscale transformation is performed in such a manner that the contrast level of the contrast image is lower, by the noise variation range, than that of the mask image, for the following reasons:

The contrast profiles of the mask and contrast images, upon extraction of one-dimensional data within the ROI, are shown in FIG. 4A. As is apparent from these contrast profiles, the positional shift between the mask and contrast images is present to some extent, along the direction of extraction (one-dimensional direction). In this case, the contrast level of the contrast image is assumed to be higher than that of the mask image. As previously described, the difference in contrast level (i.e., pixel values) between the mask and contrast images within the same ROI is due to time-dependent variations in tube current of X-ray tube.

The above-mentioned grayscale transformation is the main feature of the present invention, and will be described in more detail later. The contrast profile of the subtraction image derived from the contrast and mask images is shown in FIG. 4B. Referring to FIG. 4B, symmetrical portions M1 and M2 with respect to a given contrast level line reflect the positional shift (i.e., pixel shift) between the mask and contrast images. The criterion for the positional shift is the total of the negative component data (i.e., negative image-contrast levels), which corresponds to the entire hatched area in FIG. 4B. However, the portion reflecting the positional shift is only the M1 portion (negative contrast components). Other negative contrast components are not only unnecessary but also adversely affect the positional shift correction. This is because the sum of negative component data within the entire region of interest is not always reduced, even if the sum of negative component data of the M1 portion is small.

Conversely, when the same consideration as described above is made for the case wherein the contrast level of the mask image is higher than that of the contrast image, the contrast profiles of the mask and contrast images are as shown in FIG. 5A, and the contrast profile of the subtraction image derived therefrom is as shown in FIG. 5B. As is apparent from FIG. 5B, the sum of negative component data of the subtraction image is a hatched portion, i.e., a portion reflecting the positional shift between the mask and contrast images, and this criterion can be regarded as being effective. Therefore, the contrast level of the mask image must be higher than that of the contrast image, and gray-scale transformation is performed such that a difference between the contrast levels of the mask and contrast images is substantially equal to the noise variation range of the images.

The grayscale transformation, not the positional-shift correction is the characteristic feature of the present application as described above, and will be described in more greater detail later.

Referring back to the flowchart of FIG. 3, the processing result of grayscale transformation in third ALU 53 is written in third memory 63.

The shift direction and shift amount of the G-contrast image (i.e., grayscale-transformed contrast image) are set in second ALU 52 under the control of system controller 23 (step S3). The shift direction corresponds to one of the eight directions of arrows 12 to 19 in FIG. 6. It is a specific case that the G-contrast image may be kept unmoved (indicated by 20 in FIG. 6). The shift amounts also functions as a correction unit and are determined along the X and Y directions. That is, "D" is a predetermined pixel amount, and "X" and "Y" are horizontal and vertical address directions in each memory.

The G-contrast image is read out from third memory 63 and input to second ALU 52. Second ALU 52 shifts the G-contrast image, by the preset shift amount, in the shift direction set in step S3 (step S4). The shifted G-contrast image is written in fourth memory 64. It should be noted that the written image is referred to as an "S-contrast image".

The S-contrast image and the mask image are respectively read out from fourth and first memories 64 and 61, and are input to first ALU 51. First ALU 51 subtracts the S-contrast image from the mask image to produce a subtraction image (step S5). The resultant subtraction image is written in fifth memory 65.

Thereafter, the subtraction image is read out from fifth memory 65 and is input to fourth ALU 54. Fourth ALU 54 calculates the sum of negative component data of the input subtraction image within the ROI stored in sixth memory 66 (step S6).

System controller 23 determines whether the sum of negative components along all shift directions has been obtained (step S7). If NO in step S7, the flow returns to step S3. The operations defined in steps S3 to S6 are repeated until a total of nine sums is obtained, as a result of the G-contrast image having been shifted in eight directions 12 to 19, and kept unmoved. When all the sums of the negative component data are obtained, i.e., if YES in step S7, the direction of positional shift-correction is determined (step S8). This determination can be realized by selecting the minimum one of the nine sums. That is, the shift direction of the S-contrast image used for producing the subtraction image with minimum data is defined as the positional shift-correction direction.

Then system controller 23 determines whether positional shift-correction is required or not (step S9). If YES in step S9, that is, if the direction of positional shift-correction is determined in step S7, the G-contrast image in third memory 63 is shifted, by second ALU 52, in the positional shift-correction direction (step S10). The shift result is re-written in third memory 63. The newly-written image serves as a new G-contrast image. Thereafter, the flow returns to step S3, and the operation sequence described above is repeated.

If system controller 23 determines, in step S9, that no positional shift-correction need be performed, i.e., if NO in step S9, this determination signifies the absence of a positional shift-correction direction, and thus the flow is ended. In this case, the G-contrast image stored in third memory 63 is the position-shift corrected G-contrast image. The subtraction image, derived from this G-contrast image and the mask image, is free from any motion artifact.

SIZE OF ROI

The reason why the size of the region of interest, set in step S1, is selected as large as possible as previously mentioned, will be described below.

In the method employed in the present invention, i.e., the method of using the sum of negative component data of the subtraction image as the criterion for positional shift-correction, many portions such as a bone subjected to great changes in transmissivity of X-rays must be included in the region of interest for the following reason:

Referring to FIG. 5, if the region-of-interest is defined as a region represented by ROI, it is apparent that positional shift-correction cannot be accurately performed even if the sum of negative component data within the ROI is minimum. In this case, the conditions for performing accurate positional shift-correction are given such that all the hatched portions are included in the ROI. Therefore, the region of interest set in step S1 is preferably maximized. It can be easily understood that the actual size of the region-of-interest varies in accordance with types of images. As a result of various experiments, the size of the region-of-interest must be about $\frac{1}{4}$ or more of the entire image area.

GRAYSCALE TRANSFORMATION PROCESSING

Grayscale transformation processing methods, as the characteristic feature of the present invention, will now be described in detail below.

Before describing various transformation methods, the necessity of grayscale transformation will be explained.

In general, it is known that X-ray intensity is varied by inherent characteristics of X-ray tube 1 during the X-ray image-acquisition period. For example, one mask image and one contrast image differ in their contrast levels (i.e., pixel values) (generally using 4096 grayscale level values), as is shown in FIGS. 4A and 5A.

On the other hand, digital subtraction is used to obtain medical data by utilizing a difference between the contrast levels of the mask and contrast images. As has been described above, however, the difference in contrast level (e.g., in a bone portion) is present before subtraction, although the contrast levels are supposed to coincide with each other. If subtraction is performed under this condition, inaccurate digital subtraction inevitably occurs.

In order to eliminate subtraction image background-contrast variations caused by time-dependent variations in X-ray intensity, the ultimate object of the present invention is to convert one of the contrast levels (i.e., grayscale values, or pixel values) of the contrast and mask images into the other thereof, i.e., to match one contrast level with the other contrast level, thereby automatically correcting the difference contrast level between the images.

CONTRAST RATIO METHOD

According to this first method, a contrast ratio of the mask image to the contrast image is calculated, in units of pixels. A peak value derived from the contrast ratios of the corresponding pixels, the contrast and mask images, is used as the correction (i.e., grayscale transformation) criterion. The contrast level of each pixel constituting one of the images is multiplied by this criterion, and thus, the difference in contrast can be automatically corrected.

Figure 7:
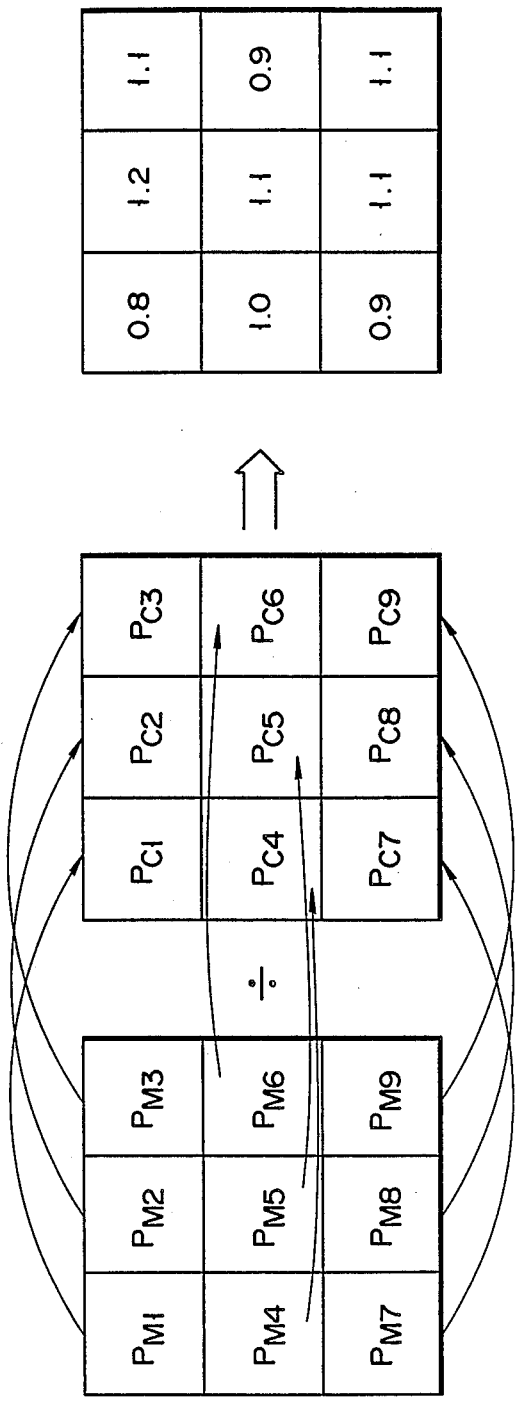
FIG. 7 is an illustration for pictorially explaining the contrast ratio method.

The above method is pictorially illustrated in FIG. 7.

Referring to FIG. 7, pixels $P_{M1}$ to $P_{M9}$ of a mask image of, for example, a 3×3 matrix are sub-divided by pixels $P_{C1}$ to $P_{C9}$, to obtain the contrast ratios given in the right side in FIG. 7. A histogram (not shown) is derived from these results. The image contrast ratio giving a peak value is obtained from the histogram. In this case, such a contrast ratio is 1.1. The ratio of 1.1 is used as the correction criterion, to correct the differences in contrast of pixels of, for example, the contrast image.

Figure 8:
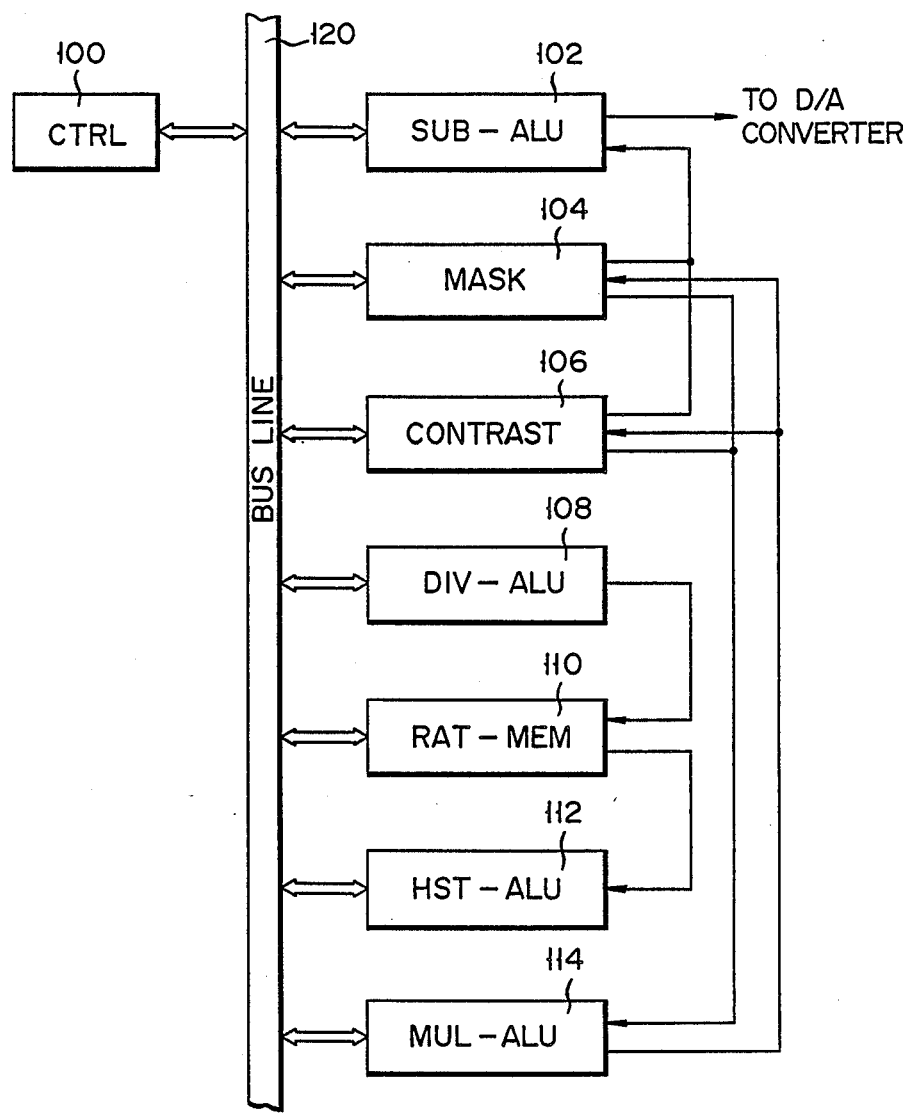
FIG. 8 is a block diagram of the contrast-ratio processor.

A contrast ratio processing circuit arrangement for practicing the above grayscale transformation operation is shown in FIG. 8.

Subtracter 102 for performing subtraction between predetermined images, image memory 104 for storing mask-image data, image memory 106 for storing contrast-image data, and divider 108 for performing division between the predetermined images, are connected to controller 100, via bus line 120. Memory 110 for storing division-result data from divider 108, histogram processor 112 having an arithmetic function for producing a histogram and a function for storing histogram data, and multiplier 114 for multiplying a predetermined image by a predetermined value, are connected to controller 100, via bus line 120.

The output from subtracter 102 can be converted into an analog signal by a D/A converter (not shown), and the analog signal can be displayed on a monitor (not shown).

The operation of the contrast-ratio processor in FIG. 8 will be described briefly. The mask-image data and the contrast-image data are respectively read out from image memories 104 and 106, and are input to divider 108. As is shown in FIG. 7, division between the corresponding pixels, for example, $P_{M5}/P_{C5}$ of the mask and contrast images, is performed by divider 108, to obtain contrast ratios of the corresponding pixels, e.g., 1.1. The resultant contrast ratios are stored in memory 110, are then read out therefrom, and are input to histogram processor 112, thereby producing a histogram.

Subsequently, under the control of controller 100, image contrast ratio "$\gamma$", indicating the peak of the resultant histogram, is read from histogram processor 112. The contrast image is read out from image memory 106 and is multiplied by $\gamma$, by multiplier 114. That is, calculation "contrast image×$\gamma$" is performed.

In association with this calculation, if the mask image is subjected to such a multiplication, calculation "$1/\gamma$×mask image" is performed.

If the contrast data, for example, $P_{C1}$ of the contrast image, is divided by the corresponding contrast data, for example, $P_{M1}$ of the mask image (i.e., $P_{C1}/P_{M1}$), image contrast ratio "$\gamma'$" is eventually obtained. Unlike in the above case, the contrast image is multiplied by $1/\gamma'$, and the mask image is multiplied by $\gamma'$.

According to the contrast ratio method described above, the image-contrast ratio indicating the peak value in the histogram is multiplied by the mask or contrast image, to automatically correct the contrast-level difference between the mask and contrast images.

VARIANCE METHOD

According to this method, an image is sub-divided into a plurality of small regions, to calculate the respective variances thereof. A small region having the minimum variance is selected. A noise amount is obtained by calculating the variances. Accordingly, the small region having the minimum variance corresponds to the one with a smallest noise amount.

Average contrast levels in small regions of the mask and contrast images are calculated, and ratios thereof, i.e., average contrast ratios, are used as a grayscale transformation criterion. One of the mask and contrast images is subjected to multiplication processing on the basis of the grayscale transformation criterion, thereby correcting the contrast-level (grayscale) difference between the mask and contrast images.

A circuit arrangement for performing the variance method described above is shown in FIG. 9. The same reference numerals as in FIG. 8 denote the same elements in FIG. 9.

Figure 9:
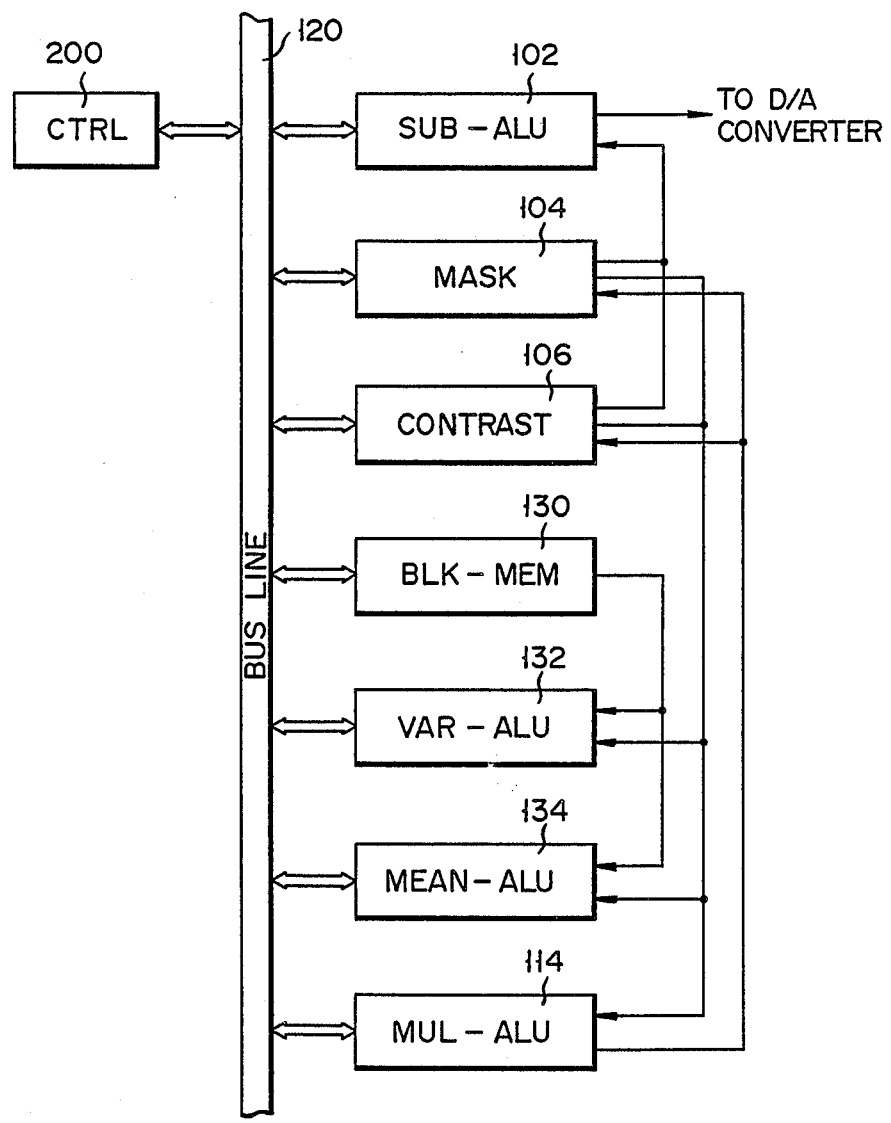
FIG. 9 is a block diagram of the processor for executing the variance method.

Referring to FIG. 9, subtracter 102, mask-image memory 104, and contrast-image memory 106 are connected to controller 200, via bus line 120, in the same manner as in FIG. 8. In addition, region designation-data memory 130 for storing data designating a small region on the image, variance arithmetic and logic section 132 for calculating the variance of each designated small region, mean value arithmetic and logic section 134 for calculating the mean value of each designated small region, and multiplier 114, are connected to controller 200, via bus line 120.

The correction operation according to the variance method will be described briefly.

Assume that mask-image data and contrast-image data are respectively prestored in image memories 104 and 106. Each image is sub-divided into a plurality of small regions. Data designating these small regions is stored in region designation-data memory 130. Variances for all the small regions of the mask or contrast image are calculated by variance arithmetic and logic section 132, and the calculated variances are stored therein. In addition, a minimum variance for one small region of either mask or contrast image is selected from the variances stored in section 132.

Mean values of the contrast levels of the small regions having the minimum variances both in the mask and contrast images are calculated by mean value arithmetic and logic section 134. If these mean values are defined as Mm and Cm, a ratio of Mm to Cm is calculated ($\gamma$=Mm/Cm). As a result, this ratio Y is used as the basic ratio of the contrast level (i.e., the grayscale-transformation criterion) for the overall image region. Therefore, the contrast image is multiplied by criterion $\gamma$, in multiplier 114. In other words, calculation "$\gamma \times$ contrast image" is performed. The mask image is multiplied by $1/\gamma$.

The above grayscale transformation sequence is performed for all small regions of the contrast or mask image, according to the variance method.

The small region having the minimum variance is specifically selected for the following reason:

In digital subtraction angiography, positional shift, caused by movement of the object under examination, is generally produced between the mask and contrast images. Under this situation, if the contrast levels (i.e., pixel values) in the small regions having the minimum contrast variations are calculated, arithmetic processing can be performed without substantially no influence by the positional shift. Eventually, the small regions having small contrast variations correspond to those having small variances. Therefore, the minimum variance is calculated to obtain the grayscale transformation criterion.

CONTRAST-ENHANCEMENT METHOD

In the above-mentioned grayscale transformation methods, one of the mask and contrast images is processed prior to subtraction processing.

A contrast-enhancement method, as a third transformation method, is used to emphasize a predetermined contrast region within the subtraction image.

Figure 10:
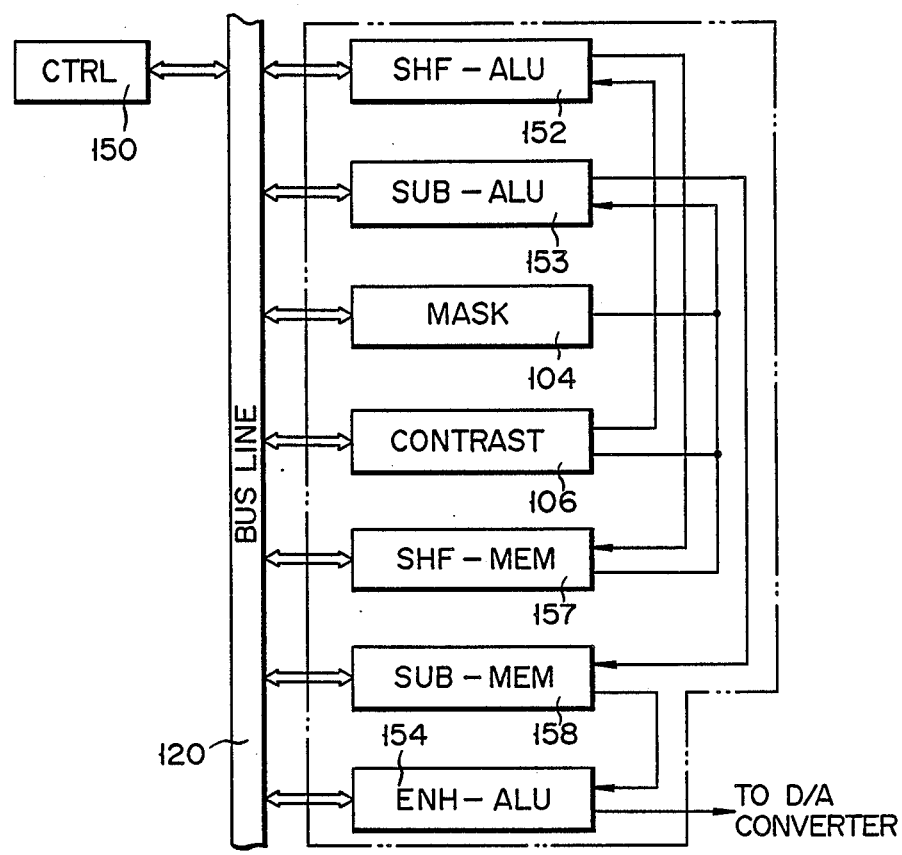
FIG. 10 is a block diagram of the contrast-enhancement processor.
Figure 11:
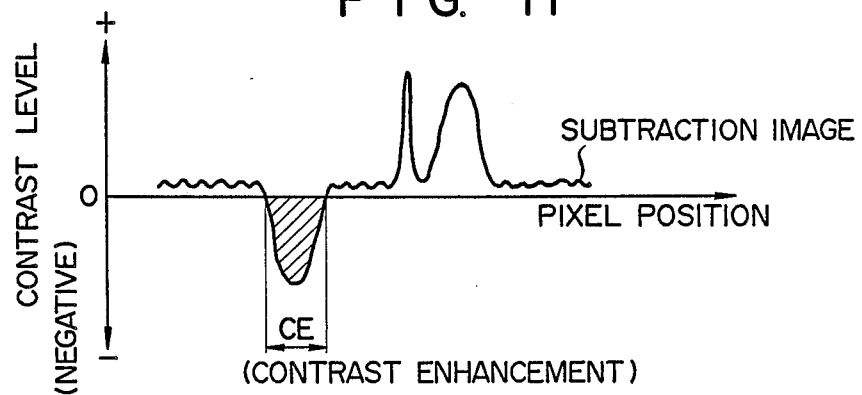
FIG. 11 represents a subtraction image to be processed by the processor shown in FIG. 10.

An image-contrast converter for performing the contrast-enhancement method is shown in FIG. 10, and will be explained with reference to FIG. 11 showing a subtraction image.

In FIG. 10, the image-contrast converter comprises first ALU 152 for two-dimensionally translating input image data and outputting the result; second ALU 153 for calculating the difference between two input image data (the image data of the mask and contrast images); third ALU 154 including a grayscale-transformation rule for emphasizing a negative contrast region, so as to grayscale-transform the input image data for display in the form of, for example, a table; first memory 106 for storing mask-image data obtained by radiation-image processing; second memory 106 for storing contrast-image data obtained by radiation-image processing; and third and fourth memories 157 and 158 for storing image data to be processed by the image-contrast converter.

The operation of the image-contrast converter having the arrangement described above will be described below.

Assume that mask-image data and contrast-image data are respectively prestored in first and second memories 104 and 106, under the control of controller 150 connected thereto, via bus line 120.

Second ALU 153 fetches mask-, and contrast-image data, under the control of controller 150, subtracts the contrast-image data from the mask-image data, and sends the resultant data, as the subtraction-image data, to fourth memory 158. The subtraction-image data is written in fourth memory 158 under the control of controller 150, and is subsequently input to third ALU 154, and is finally subjected to grayscale transformation, so as to relatively emphasize the negative contrast region according to the grayscale-transformation rule. The output from third ALU 154 is converted into a digital signal, by a D/A converter (not shown). The analog signal is supplied to a monitor (not shown) and is displayed thereon.

Contrast-emphasis processing in third ALU 154 is performed as follows:

In the contrast profile of the subtraction image in FIG. 11, hatched portion "CE" (negative component) is a contrast region which generates the motion artifact. When this contrast region is emphasized by third ALU 154 and displayed on an external monitor, comparison of the motion artifacts between a plurality of acquired subtraction images and correction of their positional shifts can be easily performed.

In other words, according to the contrast-enhancement method, predetermined contrast region "CE" of the subtraction image is emphasized to perform grayscale transformation.

It should be noted that first ALU 152 and memory 157 have a function for two-dimensional shift of the image and are not directly associated with grayscale transformation. Accordingly, a description of the operation thereof will be omitted.

OTHER GRAYSCALE-TRANSFORMATION METHODS

Two methods in FIGS. 12 and 13 are available as other grayscale-transformation methods. These methods are readily practiced by those skilled in the art, and therefore only image states will now be shown.

Referring to FIG. 12, contrast image "C" is multiplied by predetermined multiplicator "$\alpha$", to obtain first grayscale-transformed image "C'", in the same manner as described above.

Subsequently, predetermined coefficient "$\beta$" is added to image C', to obtain second grayscale-transformed image "Cc". The resultant image "Cc" is the desired grayscale-transformed contrast image.

Reference symbol "M" represents the mask image. The above-mentioned multiplication and addition may be performed by utilizing mask image "M" in place of the contrast image.

In principle, the image subjected to grayscale transformation can apparently be either the mask or the contrast image. However, in practice, the contrast level (pixel value) of the contrast image varies as a function of time. It is thus convenient to grayscale-transform the contrast image in favor of signal processing.

ADVANTAGES

According to the present invention as described above in detail, after grayscale transformation is performed for the contrast or mask image, positional shift correction can be performed between two images. Any positional shift can be accurately corrected. In the subsequent subtraction processing, the subtraction image free from motion artifacts can be obtained for better diagnosis. If the size of the ROI for obtaining the total of negative component data is selected to be about ¼ of the entire image area, manual setting by the operator can be omitted.

What is claimed is:

1. An X-ray image-processing apparatus comprising:
   X-ray radiation means for irradiating X-rays toward an object under examination, to produce X-ray images including a mask image having a determined grayscale and a contrast image having a predetermined grayscale, said mask image being produced before penetration of a contrast medium into a region of interest (ROI) of the object and said contrast image being produced after penetration of the contrast medium into the ROI; and
   image processing means including:
   means for transforming the grayscale of at least one of said images to reduce a difference in the grayscale between said mask image and said contrast image; and
   subtraction means for performing subtraction between said mask image and said contrast image and producing a subtraction image.

2. An apparatus as claimed in claim 1, wherein said grayscale transforming means transforms one of said mask image and said contrast image by eliminating noise levels from the grayscale thereof.

3. An apparatus as claimed in claim I, wherein each of said images includes a plurality of pixels, and said grayscale transforming means includes:
   means for calculating contrast ratios each being a ratio of each of the pixels in one of said images to a corresponding one of the pixels in the other of said images;
   means for producing a histogram based upon said contrast ratios and for determining a desired contrast ratio represented by a peak rectangle of the histogram; and
   means for multiplying the grayscale of one of said image by the desired contrast ratio, to correct the difference in the grayscale between said images.

4. An apparatus as claimed in claim 1, wherein said grayscale transforming means includes:
   means for dividing each of said images into a plurality of sub-divided image regions;
   first means for calculating variances, including a minimum variance, which is related to the sub-divided image regions of one of said images and selecting the sub-divided image regions which has the minimum variance;
   second means for calculating a first average grayscale of the one of the sub-divided image regions which has said minimum variance, and a second average grayscale of one of said sub-divided image regions of the remaining one of said images, which corresponds to said one sub-divided image region having the minimum variance, and calculating a ratio of the first average grayscale to the second average grayscale; and
   means for multiplying the grayscale of one of said images by said ratio of the average grayscales, to correct the difference int eh grayscale of one of said images.

5. An apparatus as claimed in claim 4, wherein said first means calculates said variances which relate to the sub-divided image regions of the contrast image.

6. An apparatus as claimed in claim 1, wherein said grayscale transforming means includes:
   means for temporarily storing the subtraction image derived from said subtraction means; and
   means for converting grayscales of said subtraction image in such a manner that a region of said subtraction image having a predetermined control level is emphasized with respect to the overall region of the subtraction image, based upon a grayscale transformation table.

7. An apparatus as claimed in claim 6, wherein said region having the predetermined control level has negative control levels.

8. An apparatus as claimed in claim 1, wherein said grayscale transforming means multiplies the grayscales of one of said images by a predetermined multiplier and outputs a grayscale-transformed image.

9. An apparatus as claimed in claim 8, wherein said grayscale transforming means further adds said grayscale-transformed image and a predetermined coefficient to obtain a second grayscale-transformed image.

10. An apparatus as claimed in claim 1, wherein said grayscale transforming means transforms the grayscale of said contrast image.

11. An apparatus as claimed in claim 1, wherein a size of said ROI is selected to be larger than approximately one-fourth of the entire image.

12. An apparatus as claimed in claim 1, further comprising:
   means for correcting positional shifts between said mask image and said contrast image after the grayscale of one of both said images is grayscale-transformed.

13. An X-ray image-processing apparatus comprising:

X-ray radiation means for irradiating X-rays toward an object under examination to produce two kinds of X-ray images including a mask image having a determined grayscale and a contrast image having a predetermined grayscale, said mask image being produced before penetration of a contrast medium into a region of interest (ROI) of the object and said contrast image being produced after penetration of the contrast medium into the ROI; and image processing means including:

means for transforming the grayscale of one of said images so that said mask image has the grayscale higher than that of said contrast image and a difference in the grayscale between said image and said contrast image is reduced; and subtraction means for performing subtraction between said mask image and said contrast image, the grayscale of one of which is transformed by said transforming means, and producing a subtraction image.

14. An X-ray image-processing apparatus comprising:

X-ray radiation means for irradiating X-rays toward an object under examination to produce X-ray images, one of which includes a mask image having a determined grayscale and the other of which includes a contrast image having a predetermined grayscale, said mask image being produced before penetration of a contrast medium into a region of interest (ROI) of the object and said contrast image being produced after penetration of the contrast medium into the ROI; and image processing means including:

means for transforming the grayscale of one of said images so that said contrast image has the grayscale lower than that of said mask image and a difference in the grayscale between said mask image and said contrast image is reduced; and subtraction means for performing subtraction between said mask image and said contrast image, the grayscale of one of which is transformed by said transforming means, and producing a subtraction image.

* * * * *